(12) United States Patent
Kono et al.

(10) Patent No.: US 6,218,053 B1
(45) Date of Patent: Apr. 17, 2001

(54) THIN APROTIC ELECTROLYTE FILMS, IMMOBILIZED LIQUID MEMBRANE CONDUCTORS, AND BATTERIES

(75) Inventors: Koichi Kono; Kotaro Takita; Norimitsu Kaimai, all of Kawasaki (JP)

(73) Assignee: Kawabi & Associates, Tokyo (JP)

( * ) Notice: Subject to any disclaimer, the term of this patent is extended or adjusted under 35 U.S.C. 154(b) by 0 days.

(21) Appl. No.: 09/230,174

(22) PCT Filed: May 20, 1998

(86) PCT No.: PCT/JP98/02205

§ 371 Date: May 26, 1999

§ 102(e) Date: May 26, 1999

(87) PCT Pub. No.: WO98/53465

PCT Pub. Date: Nov. 26, 1998

(30) Foreign Application Priority Data

May 21, 1997 (JP) .................................................. 9-147298
May 21, 1997 (JP) .................................................. 9-147299

(51) Int. Cl.$^7$ .................................................. H01M 6/18
(52) U.S. Cl. ........................ 429/306; 429/309; 429/317; 429/303; 252/62.2
(58) Field of Search ................................. 429/306, 309, 429/310, 317, 303; 252/62.2

(56) References Cited

U.S. PATENT DOCUMENTS 5,237,031 * 8/1993 Kubota et al. .................... 429/218.1

* cited by examiner

Primary Examiner—Laura Weiner
(74) Attorney, Agent, or Firm—Venable; Marina V. Schneller

(57) ABSTRACT

The present invention provides a thin film of non-protonic electrolyte and electrolyte-immobilized liquid-film conductor, easily produced into a thin film and to have a large area, securely holding the non-protonic electrolytic solution over a wide temperature range, and showing stability for extended periods and improved mechanical strength. They comprise a polyolefin film with a solvent-resistant polyolefin as the basic component, which is impregnated with the non-protonic electrolytic solution to immobilize it. The polyolefin composition for the film contains a terminal-modified polypropylene having, in the terminal chain, a functional group showing an affinity for the solvent for the electrolytic solution for the thin film of non-protonic electrolyte, and further contains an electron-conductive substance in addition to the terminal-modified polypropylene for the electrolyte-immobilized liquid-film conductor. As a result, the polyolefin film stably holds the solvent for the electrolytic solution. The present invention also provides a battery which uses the above thin film of non-protonic electrolyte and/or electrolyte-immobilized liquid-film conductor.

14 Claims, No Drawings

THIN APROTIC ELECTROLYTE FILMS, IMMOBILIZED LIQUID MEMBRANE CONDUCTORS, AND BATTERIES

CROSS REFERENCE TO RELATED APPLICATIONS

This application is the United States National Stage of International Application No. PCT/JP98/02205 filed May 20, 1998, the entire specification of which is incorporated herein by reference, and claims priority to Japanese Application Nos. 9/147298 filed May 21, 1997 and 9/147299 filed May 21, 1997.

TECHNICAL FIELD

This invention relates to a thin film of non-protonic electrolyte, electrolyte-immobilized liquid-film conductor and battery composed thereof, and, more particularly, the thin film of non-protonic electrolyte in which the non-protonic electrolytic solution is immobilized in the polyolefin film, the electrolyte-immobilized liquid-film conductor in which an ionic conductor is immobilized in the electroconductive film having a high electron conductivity, and the battery composed thereof.

BACKGROUND OF THE INVENTION

Thin electrolyte films can be used in various devices which are required to have low film resistance and high mechanical strength, such as fuel cells, salt electrolysis devices, primary and secondary batteries, membranes for facilitated transport, electrochromic devices, sensors, etc. In particular, they can be used as solid polymer electrolytes for lithium secondary batteries.

Development of the lithium secondary battery of solid polymer electrolyte has been attracting much attention, because of its various advantages, such as controlled formation of dendrite of metallic lithium which may cause damages resulting from short circuit and ignition, no leakage of liquid unlike the case of a solution type secondary battery, and particularly ability of being made into a thin film and large area.

Some of the polymer type solid electrolytes developed so far use a lithium salt such as $LiClO_4$ dissolved and dispersed in a polymer, such as polyether including polyethylene oxide and polypropylene oxide, polyester, polyimide and polyether derivatives. Such an electrolyte, however, needs a sufficiently higher temperature above room temperature to exhibit an ionic conductivity of $10^{-5}$ to $10^{-3}$ S/cm.

One of the methods to decrease effective resistance of a thin film is to immobilize a liquid ionic conductor by capillary condensation in fine pores, 0.1 $\mu$m or less in size, in a thin porous film of a solid polymer, 50 $\mu$m or less in thickness, as disclosed by Japanese Patent Laid-Open No. 1-158051. This method, however, does not drastically solve the problems associated with operating temperature.

Some polymer batteries use gelled polymer electrolytes, where the polymer matrices are impregnated with a solution similar to that for the conventional solution type lithium battery. These electrolytes include cross-linked polyalkylene oxide as disclosed by U.S. Pat. No. 4,303,748 and gelled polyacrylate as disclosed by U.S. Pat. No. 4,830,939. These electrolytes, however, still have problems of solvent maintainability, because the electrolytic solution may ooze out at high temperature as a result of gel shrinkage.

It is well known that some polymers are incorporated with an electron-conductive substance, such as carbon black, to be made electroconductive. Such polymers include polyethylene, polypropylene, polyvinyl chloride, polysulfone, butadiene rubber, silicone rubber, ethylene-propylene-diene terpolymers. These electroconductive polymers are used for anti-static devices, electromagnetic wave shielding devices, electroconductive paints, adhesives, IC packaging materials, and planar heating sheets and switches.

For the conductor, a thin-film conductor having a high conductivity can be effectively used as the electrode or as a material for the electrode of the device which involves a solid polymer or liquid electrolyte. It provides a large contact interface between the electrode and electrolyte, making it suitable for primary and secondary lithium batteries of high functions.

Japanese Patent Laid-Open No. 3-87096 discloses a porous electroconductive film and production thereof, where an electrolytic solution is immobilized by capillary condensation force on the porous thin film produced from a plasticizer solution of polyethylene incorporated with Keten black (trade name of Akzo Chemicals), which is molded into sheet, drawn and treated to remove the plasticizer. However, the problems associated with maintainability of electrolytic solution are not completely solved by this technique. More recently, a new technique has been developed that uses a polymer gel as the anode or cathode of the battery, where the polymer gel is impregnated with a carbonate-based solution with $LiMn_2O_4$ and carbon black or petroleum coke and carbon black dissolved in a copolymer of polyvinylidene fluoride and hexafluoropropylene to dissolve a lithium salt, as disclosed by U.S. Pat. No. 5,296,318. These electrolytes, however, have still problems of solvent maintainability, because the electrolytic solution may ooze out at high temperature as a result of gel shrinkage. Therefore, thin-film conductors which can be easily produced to have a large area and exhibit stable maintainability of the electrolytic solution over a wide temperature range are increasingly demanded.

It is an object of the present invention to solve the above problems, and to provide a thin film of non-protonic electrolyte which is easily produced into a thin film and to have a large area, holds the solvent for the non-protonic electrolytic solution over a wide temperature range, is stable over extended periods and has improved mechanical strength; an electrolyte-immobilized liquid-film conductor; and a method of production thereof.

DISCLOSURE OF THE INVENTION

The inventors of the present invention have found, after the extensive studies to solve the problems involved in the conventional techniques, that a thin film of non-protonic electrolyte, or electrolyte-immobilized liquid-film conductor which holds fast the solvent for the electrolytic solution by impregnating a polyolefin composition having a solvent-resistant polyolefin as the basic component and containing a polymer which has, in the terminal chain, a functional group with affinity for the solvent used for dissolving the electrolyte, or a polyolefin film composed of the polyolefin composition further containing an electron-conductive substance, with the non-protonic electrolytic solution to immobilize the solution in the film, reaching the present invention.

The present invention provides a thin film of non-protonic electrolyte and electrolyte-immobilized liquid-film conductor, with the non-protonic electrolytic solution immobilized in the polyolefin film composed of a polyolefin composition containing a terminal-modified polypropylene for the former, and in the polyolefin film composed of the polyolefin composition further containing an electron-conductive substance for the latter, and a battery which uses the above.

PREFERRED EMBODIMENTS OF THE INVENTION

I. Thin Film of Non-protonic Electrolyte

The thin film of non-protonic electrolyte of the present invention has a solvent-resistant polyolefin film as the basic component. The polyolefin film is composed of a polyolefin resin composition containing a terminal-modified polypropylene which has, in the terminal chain, a functional group with affinity for the solvent used for dissolving the electrolyte to make the electrolytic solution. The thin film stably holds the electrolytic solution in which an electrolyte is dissolved in a solvent. The thin film of non-protonic electrolyte of the present invention is described in more detail:

1. Polyolefin film containing terminal-modified polypropylene a. Polyolefin

Polyolefins useful for the present invention include polyethylene, polypropylene, copolymer of ethylene and propylene, polybutene-1, poly-4-methylpentene-1, of which polypropylene is more preferable. Polypropylene useful for the present invention includes the homopolymer, and copolymers of propylene with α-olefins, such as ethylene, butene-1, pentene-1, hexene-1 and 4-methyl-pentene-1, prepared by random, block or graft copolymerization.

b. Terminal-modified polypropylene

Terminal-modified polypropylene is polypropylene with one or more functional group structures at its terminals. Such polypropylene is not limited to the homopolymer, but includes block-copolymerized rubber from propylene and one or more types of other α-olefin compounds, such as ethylene, 1-butene, 1-hexane and 4-methyl-1-pentene.

Terminal-modified polypropylene can be produced by the following procedure:

It is produced by reacting living polypropylene, a product of living polymerization of propylene, with a monomer having a functional group over a catalyst comprising specific vanadium and organic aluminum compounds.

The preferable vanadium compounds are V(acetyl acetonate)3, V(2-methyl-1,3-butanedionate)$_3$ and V(1,3-butanedionate)$_3$. The preferable organic aluminum compounds are those having a carbon number of 1 to 18, preferably 2 to 6, and mixtures and complexes thereof, such as dialkyl aluminum monohalides, monoalkyl aluminum dihalides and alkyl aluminum sesquihalides.

Polymerization is preferably effected in an inert solvent which is liquid under the polymerization conditions. These solvents include saturated aliphatic, saturated alicyclic and aromatic hydrocarbons.

Quantity of the catalyst for polymerization of propylene is $1 \times 10^{-4}$ to 0.1 mols, more preferably $5 \times 10^{-4}$ to $5 \times 10^{-2}$ mols of the vanadium compound, and $1 \times 10^{-4}$ to 0.5 mols, more preferably $1 \times 10^{-3}$ to 0.1 mols of the organic aluminum compound for mol of propylene. It is preferable to control quantity of the organic aluminum compound at 4 to 100 mols for each mol of the vanadium compound.

The living polymerization is normally effected at -100 to 100° C. for 0.5 to 50 h. Molecular weight of living polypropylene produced can be controlled by controlling reaction temperature and time. It is possible to produce polymer having a molecular weight distribution dose to that of the monodisperse system by keeping the polymerization temperature low, in particular -30° C. or lower. When produced at -50° C. or lower, the living polymer can have a Mw (weight-average molecular weight)/Mn (number-average molecular weight) ratio of 1.05 to 1.40.

As described above, it is possible to produce living polypropylene having a number-average molecular weight of approximately 800 to 400,000 and close to a monodisperse system.

Next, living polypropylene is reacted with a monomer having a functional group, to introduce the functional group structure at the terminal. The monomers useful for the above purpose include acrylic acid, methacrylic add, acrylic acid ester, methacrylic acid ester, acrylamide, acrylonitrile, styrene and their derivatives. More concretely, acrylic acid esters include acrylic monomers, such as methyl acrylate, ethyl acrylate, butyl acrylate, isobutyl acrylate, 2-ethyl hexyl acrylate, lauryl acrylate, stearyl acrylate, ethyldecyl acrylate, ethylhexyldecyl acrylate, 2-ethoxyethyl acrylate, tetrahydrofururyl acrylate, trimethylolpropane triacrylate, 2-hydroxyethyl acrylate, 2-hydroxypropyl acrylate, 1,4-butadiol diacrylate, and 1,6-hexadiol diacrylate. Methacrylic acid esters include methacrylic monomers, such as methyl methacrylate, ethyl methacrylate, butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, glycidyl methacrylate and ethylene glycol dimethacrylate. They can be used either alone or in combination. Cross-linkable monomers, such as vinyl acrylate, vinyl methacrylate, divinyl benzene and butyl vinylacrylate may be used, as required. Of these, more preferable monomers are acrylic acid, methacrylic acid and their esters, and acrylic monomers such as acrylamide and its derivatives.

The monomer is selected from the above, depending on solvent type for the electrolytic solution used to produce the thin-film electrolyte. More concretely, it is selected in consideration of the Hansen parameter as one of solubility parameters. The Hansen parameter is a solubility parameter in which the effects on solubility are divided into three component, δd, δp and δh representing the effects by non-polar interactions, polarization and hydrogen bonds, respectively, which are plotted in a three-dimensional coordinates (C. M. Hansen, et al., Encyclopedia of Chemical Technology, N.Y., p. 889, 1971). The parameter is investigated for many solvents. It indicates whether a solvent is good or poor for a specific polymer. For example, the Hansen parameter of good solvents for specific polymers, when plotted in the three-dimensional spatial coordinates of δd, δp and δh, is distributed in a sphere of certain size. In other words, a solvent is considered to be a good one for a specific polymer, when the positions of δd, δp and δh of the solvent and polymer are sufficiently close to each other in the three-dimensional coordinates.

In the present invention, quantity of one or more monomers constituting a living polymer is adjusted to the Hansen parameter of the solvent for the electrolytic solution, in order to effectively swell the solution into gel and quickly immobilize it. The film composed of the resin composition containing the terminal-modified living polymer selectively includes the solvent for the electrolytic solution having an affinity for the functional group in the living polymer. Its swell, however, is controlled adequately as a whole to prevent its excessive deformation and decrease in strength, because of high solvent-resistance of polyolefin as the basic material for the film.

For the reaction between living polypropylene and the monomer containing a functional group, the monomer is supplied to the reaction system containing living polypropylene. The reaction is normally effected at -100 to 150° C. for 5 min to 50 h. Degree of modification at the polypropylene terminal(s) by the monomer unit can be increased by increasing reaction temperature or time. In general, the quantity of the monomer is set at 1 to 1000 mols for each mol of living polypropylene.

The terminal-modified polypropylene thus produced has a number-average molecular weight (Mn) of around 800 to 500,000, and a very narrow molecular weight distribution Mw/Mn=1.05 to 1.40) characteristic of the living polymer itself. It also has 0.1 to 500, preferably 0.5 to 100, terminal structures of the monomer on the average at its terminals. The terminal-modified polymer has a syndiotactic diad fraction of 0.6 or higher, which is also one of its characteristics.

c. Composition of polyolefin and terminal-modified polypropylene

Quantity of the terminal-modified living-polymerized polypropylene is 10 to 100% by weight based on the polyolefin, preferably 30 to 100% by weight. At below 10% by weight, the impregnation and immobilization effects of the solvent for the electrolytic solution are no longer expected.

d. Production of polyolefin film

The polyolefin film of the present invention is produced from a composition of a polyolefin incorporated with the above terminal-modified polypropylene. The homogeneous composition of these components can be obtained by melting them or dissolving them in a solvent. One of the dissolution methods uses a solvent such as decalin or xylene in which the composition of polyolefin and terminal-modified polypropylene is dissolved to form the homogeneous solution. The film is made from this solution and dried.

The polyolefin film can be incorporated, as required, with one or more types of additives, such as antioxidant, ultraviolet absorber, aggregate, anti-blocking agent, pigment, dye and inorganic filler to the extent they are compatible with the object of the present invention.

e. Film properties

The polyolefin film containing the terminal-modified polypropylene is 1 to 1000 $\mu$m thick, preferably 5 to 500 $\mu$m thick. Thickness of below 1 $\mu$m causes practical problems, such as insufficient mechanical strength and difficulty in handling, whereas thickness above 1000 $\mu$m excessively increases effective resistance and decreases volumetric efficiency as an ion conductor.

2. Immobilization of non-protonic electrolytic solution in polyolefin film a. Electrolytic solution The non-protonic electrolytic solutions useful for the present invention include alkaline metal and alkaline-earth metal salts, such as LiF, NaI, LiI, $LiClO_4$, $LiAsF_6$, $LiPF_6$, $LiBF_4$, $LiCF_3SO_3$, and NaSCN.

The non-protonic solvents for the non-protonic electrolytic solutions useful for the present invention are those resistant to alkaline metals, concretely, such as propylene carbonate, ethylene carbonate, $\gamma$-butyrolactone, dimethoxyethane, acetonitrile, formamide, tetrahydrofuran and diethyl ether, either alone or in combination. The functional group for the terminal-modified polypropylene is selected in such a way that it shows an affinity for the solvent used for the present invention, as described earlier.

b. Method for immobilization of electrolytic solution

The non-protonic electrolytic solution, in which an electrolyte is dissolved in a solvent, can be immobilized in the polyolefin film by impregnation, spreading, spraying or a combination thereof The polyolefin film is easily impregnated with the electrolytic solution to immobilize it, because of affinity of the terminal functional group of the terminal-modified polypropylene for the non-protonic solvent. The electrolytic solution can be immobilized before or during assembly of the film into the battery, or in the final assembling stage.

The battery thus produced uses the electrolytic solution similar to the conventional non-protonic liquid electrolytic solution. However, it is free from the problems resulting from liquid leakage and is made more incombustible because of much reduced vapor pressure of the solution, since the solution is immobilized by the action of the polyolefin film to dissolve and swell the solution. The immobilized electrolytic solution is similar to the liquid in ion conductivity, and is free from the problems associated with operating temperature.

II. Electrolyte-immobilized Liquid-film Conductor

The electrolyte-immobilized liquid-film conductor of the present invention is composed of a polyolefin film, as the basic component, containing an electron-conductive substance. It contains the terminal-modified polypropylene with a functional group in the terminal chain, which shows an affinity for the solvent for the electrolytic solution, stably holding the immobilized electrolytic solution in which the electrolyte is dissolved in the solvent. The electrolyte-immobilized liquid-film conductor is described in more detail:

a. Polyolefin

The solvent-resistant polyolefin as the basic component for the polyolefin film is similar to the one for the non-protonic electrolyte film, described in Section I.

b. Terminal-modified polypropylene

The terminal-modified polypropylene for the polyolefin film is similar to the one for the non-protonic electrolyte film, described in Section I.

c. Electron-conductive substances

The electron-conductive substances useful for the present invention are a variety of metals and semiconductors, oxides and sulfides, and carbon and graphite. They may be granular, fibrous, fibril or whisker. The particularly preferable substances include anode-activating substances, such as $TiS_3$, $TiS_2$, $TiO_2$, $V_2O_5$, $NbSe_3$, $MnO_2$, $LiCoO_2$, $LiNiO_2$, $LiMn_2O_4$, $PbO_2$ and NiOOH; cathode-activating substances, such as petroleum coke, natural graphite, carbon fiber, Pb and Cd; and electroconductive agents, such as acetylene black, Ketjen black (trade name of Akzo Chemicals), carbon whisker, graphite whisker and graphite fibrils.

d. Composition of polyolefin, terminal-modified polypropylene and electron-conductive substance Quantity of the terminal-modified polypropylene is 10 to 100% by weight based on the polyolefin, more preferably 30 to 100% by weight. At below 10% by weight, the impregnation and immobilization effects of the solvent for the electrolytic solution will be no longer expected.

Quantity of the electron-conductive substance is 1 to 200% by weight based on the polyolefin, more preferably 5 to 100% by weight. Conductivity is insufficient at below 1% by weight, and practically sufficient film strength may not be secured at above 200% by weight.

e. Production of film

The polyolefin film of the present invention, containing terminal-modified polypropylene and electron-conductive substance, is produced from a composition of polyolefin incorporated with the above terminal-modified polypropylene and electron-conductive substance. The homogeneous composition of these components can be obtained by melting them or dissolving them in a solvent comprising the polyolefin and terminal-modified polypropylene. One of the dissolution methods uses a solvent such as decalin or xylene in which the composition of polyolefin incorporated with the terminal-modified polypropylene is dissolved to form the homogeneous solution, which is then uniformly incorporated with the electron-conductive substance. The film is made from this solution and dried.

The polyolefin film can be incorporated, as required, with one or more types of additives, such as antioxidant, ultraviolet absorber, aggregate, anti-blocking agent, pigment, dye and inorganic filler to the extent they are compatible with the object of the present invention.

f. Properties

The polyolefin film containing the electron-conductive substance and terminal-modified polypropylene is 1 to 1000 $\mu$m thick, preferably 5 to 500 $\mu$m thick. Thickness of below 1 $\mu$m causes practical problems, such as insufficient mechanical strength and difficulty in handling, whereas thickness above 1000 $\mu$m excessively increases effective resistance and decreases volumetric efficiency as an ion conductor.

2. Immobilization of the non-protonic electrolytic solution in the polyolefin film containing the terminal-modified polypropylene and electron-conductive substance a. Electrolytic solution The electrolytic solution similar to the one for the non-protonic electrolyte film, described in Section I, can be used.

b. Method for immobilization of electrolytic solution

The non-protonic electrolytic solution can be immobilized in the polyolefin film containing the terminal-modified polypropylene and electron-conductive substance by impregnation, spreading, spraying or a combination thereof. The electrolytic solution can be immobilized before or during assembly of the film into the battery, or in the final assembling stage.

c. Conductivity of electrolyte-immobilized liquid-film conductor

The electrolyte-immobilized liquid-film conductor composed of the above components should have a conductivity of $10^{-5}$ S/cm or higher, more preferably $10^{-3}$ S/cm or higher. Effective resistance of the conductor is impractically high at a conductivity below $10^{-5}$ S/cm. For example, effective resistance of the 1 $\mu$m thick film is 1 $\mu$m/$10^{-5}$ S/cm, or 10 $\Omega$cm$^2$.

III. Battery

The thin film of non-protonic electrolyte of the present invention can be used for the polymer battery of the present invention together with the conventional types of anode and cathode. In particular, the thin film of non-protonic electrolyte gives a safer and more economical polymer battery than the conventional one which uses a liquid electrolyte, when combined with at least one of the anode-immobilized liquid-film conductor containing an anode-activating substance as the electron-conductive substance and the cathode-immobilized liquid-film conductor containing a cathode-activating substance as the electron-conductive substance.

The electroconductive thin film or electrolyte-immobilized liquid-film conductor of the present invention gives, together with light, flexible composite electrodes, the polymer battery in which the solvent for the electrolytic solution is immobilized by solubility of the polymer used, excessive swelling is controlled by polyolefin as the basic component of the film, the solvent for the electrolytic solution can be held stably over a wide temperature range, evaporation of the solvent for the electrolytic solution is well controlled, and good conductivity is kept over a wide temperature range. In other words, it gives the polymer battery which has improved safety with respect to overcharge without excessively decreasing electron-conductivity.

The polymer battery of the present invention discharges electricity more efficiently than the conventional liquid-electrolyte lithium battery, because the organic electrolytic solution can be contained in the lithium ion conductive polymer film, which allows the lithium ions to pass not only through the electrolytic solution but also through the polymer electrolyte. Moreover, the electrolytic solution immobilized in the polymer secures passages for diffusion of the ions at a high speed, which allows the battery to discharge electricity more efficiently than the conventional polymer-electrolyte lithium battery.

Coating the interfaces between the electrolyte and electrodes partly or totally with a lithium ion conductive polymer reduces oxidation/reduction of the organic electrolytic solution by the anode and cathode, which is one of the major problems involved in high-voltage batteries, and hence improves the charge/discharge characteristics. The lithium ion conductive polymer can secure efficient discharge, also in this case.

PREFERRED EMBODIMENTS

The present invention is described more concretely by the following preferred embodiments, which by no means limit the present invention.

EXAMPLE 1

A mixture composed of 20 weight parts of crystalline polypropylene (weight-average molecular weight: $4.5 \times 10^5$), 10 weight parts of living-polymerized polypropylene (weight-average molecular weight: $5 \times 10^4$), each molecule having methyl acrylate group at the terminal, and 70 weight parts of decalin was incorporated with 0.375 weight parts, for 100 weight parts of the polyolefin composition, of an antioxidant, and molten with stirring at 160° C. It was injected into a metallic tray and formed into a film.

The film was treated at room temperature to remove the solvent by evaporation and dried at 120° C. under a vacuum, to prepare a polypropylene film containing the terminal-modified polypropylene.

A propylene carbonate solution containing 1 mol of LiPF$_6$ was dripped onto the 25 $\mu$m thick film, prepared above, at 25° C. It was left in a closed container for 1h, to prepare a thin film of non-protonic electrolyte having a rate of swell (weight gain) of 86%.

The thin film of non-protonic electrolyte, prepared above, was cut into a sphere of 10 mm in diameter and sandwiched by platinum black electrodes, to measure its electrical resistance with AC (frequency: 1 kHz). Its ionic conductivity was $6 \times 10^{-3}$ S/cm, as determined from the resistance level, and thickness and area of the thin film.

EXAMPLE 2

A mixture composed of 30 weight parts of living-polymerized polypropylene (weight-average molecular weight: $5 \times 10^4$), each molecule having methyl acrylate group at the terminal, and 70 weight parts of methylene chloride was incorporated with 0.37 weight parts, for 100 weight parts of the mixture, of an antioxidant, and molten with stirring. It was injected into a metallic tray, where it was treated at room temperature to remove the solvent by evaporation and dried under a vacuum, to prepare a polypropylene film.

A propylene carbonate solution containing 1 mol of LiPF$_6$ was dripped onto the 30 $\mu$m thick film, prepared above, at 25° C. It was left in a closed container for 1 h, to prepare a thin film of non-protonic electrolyte having a rate of swell (weight gain) of 113%.

The thin film of non-protonic electrolyte, prepared above, was cut into a sphere of 10 mm in diameter and sandwiched by platinum black electrodes, to measure its electrical resistance with AC (frequency: 1 kHz). Its ionic conductivity was $8 \times 10^{-3}$ S/cm, as determined from the resistance level, and thickness and area of the thin film.

EXAMPLE 3

A mixture composed of 20 weight parts of crystalline polypropylene (weight-average molecular weight: $4.5 \times 10^5$), 10 weight parts of living-polymerized polypropylene (weight-average molecular weight: $5 \times 10^4$), each molecule having methyl acrylate group at the terminal, 30 weight parts of petroleum coke powder, 3 weight parts of Ketjen black (trade name of Akzo Chemicals) and 70 weight parts of decalin was incorporated with 0.37 weight parts, for 100 weight parts of the mixture, of an antioxidant, and molten with stirring at 160° C. It was injected into a metallic tray and formed into a film. The film was treated at room temperature to remove the solvent by evaporation and dried at 120° C. under a vacuum, to prepare a polypropylene film containing the terminal-modified polypropylene and electron-conductive substance.

A propylene carbonate solution containing 1 mol of $LiPF_6$ was dripped onto the 25 μm thick film, prepared above, at 25° C. It was left in a closed container for 1 h, to prepare an electrolyte-immobilized liquid-film conductor having a rate of swell (weight gain) of 87%.

The electrolyte-immobilized liquid-film conductor, prepared above, was cut into a sphere of 10 mm in diameter and sandwiched by platinum black electrodes, to measure its electrical resistance with AC (frequency: 1 kHz). Its specific conductivity was $6 \times 10^{-2}$ S/cm, as determined from the resistance level, and thickness and area of the thin film.

EXAMPLE 4

A mixture composed of 30 weight parts of living-polymerized polypropylene (weight-average molecular weight: $5 \times 10^4$), each molecule having methyl acrylate group at the terminal, 30 weight parts of petroleum coke powder, 3 weight parts of Ketjen black (trade name of Akzo Chemicals) and 70 weight parts of methylene chloride was incorporated with 0.37 weight parts, for 100 weight parts of the mixture, of an antioxidant, and molten with stirring. It was injected into a metallic tray, where it was treated at room temperature to remove the solvent by evaporation and dried under a vacuum, to prepare a polypropylene film containing the electron-conductive substance.

A propylene carbonate solution containing 1 mol of $LiPF_6$ was dripped onto the 30 μm thick film, prepared above, at 25° C. It was left in a closed container for 1 h, to prepare a thin film of non-protonic electrolyte having a rate of swell (weight gain) of 135%.

The thin film of non-protonic electrolyte, prepared above, was cut into a sphere of 10 mm in diameter and sandwiched by platinum black electrodes, to measure its electrical resistance with AC (frequency: 1 kHz). Its specific conductivity was $7 \times 10^{-2}$ S/cm, as determined from the resistance level, and thickness and area of the thin film.

Industrial Applicability

The thin film of non-protonic electrolyte of the present invention uses a polyolefin film as the substrate, which contains living polypropylene with a terminal functional group. It immobilizes the electrolytic solution by the action of the functional group in the terminal chain and controls excessive swelling of the electrolytic solution by the basic component of the polyolefin film, stably holding the solution over a wide temperature range and keeping evaporation rate of the solvent for the electrolytic solution at a very low level. Its ionic conductivity can be easily controlled for specific purposes by controlling type and length of the functional group. Therefore, it is protected efficiently from overcharge, without an excessive decrease in ionic conductivity.

The thin film of non-protonic electrolyte of the present invention has a sufficiently high mechanical strength and durability to be suitably used for various devices which use a non-protonic electrolytic solution, such as primary and secondary batteries and condensers, in particular lithium-based primary and secondary batteries.

The electrolyte-immobilized liquid-film conductor of the present invention immobilizes the electrolytic solution by solubility of the terminal-modified polymer introduced, and controls excessive swelling of the solution by the basic component of polyolefin, stably holding the solution over a wide temperature range, keeping evaporation rate of the solution at a very low level and thereby showing good conductivity over a wide temperature range. Therefore, it is efficiently protected from overcharge, without an excessive decrease in ionic conductivity. The conductor has a high mechanical strength by virtue of the basic component of polyolefin, and can be produced by the existing battery production line, essentially without changing it. The conductor, having conductivity both for ions and electrons, can be used for electrodes for various devices, such as batteries, electrochromic devices, electrical double layer condensers and liquid crystal devices which use an electrolyte, in particular liquid electrolyte. The ion conductor in the electrolyte-immobilized liquid-film conductor, being continuous with the electrolyte between the electrodes and in close contact with the conductive film over a wide area, is also suited for the electrodes for a variety of cells and devices which use an electrolyte.

The polymer battery of the present invention, which uses the thin film of non-protonic electrolyte or electrolyte-immobilized liquid-film conductor, allows the lithium ions to pass not only through the electrolytic solution but also through the polymer electrolyte, thus discharging electricity more efficiently than the conventional lithium battery of liquid-state electrolyte. The electrolytic solution immobilized in the polymer electrolyte in the battery of the present invention secures passages for fast diffusion of the ions, making the battery more advantageous over the conventional lithium battery of polymer electrolyte in various aspects, such as higher discharging function at low temperature, lesser self-discharge at high temperature, and higher charge/discharge characteristics over extended periods.

Coating the interfaces between the electrolyte and electrodes partly or totally with a lithium ion conductive polymer reduces oxidation/reduction of the organic electrolytic solution by the anode and cathode, which is one of the major problems involved in high-voltage batteries, and hence improves the charge/discharge characteristics.

What is claimed is:

1. A thin film of non-protonic electrolyte, comprising a non-protonic electrolytic solution immobilized in a polyolefin film containing a terminal-modified polypropylene.

2. The thin film of non-protonic electrolyte of claim 1 wherein said polyolefin film is composed of a composition containing 10 to 100% by weight of a terminal-modified polypropylene.

3. The thin film of non-protonic electrolyte of claim 1 wherein said terminal-modified polypropylene is produced by living polymerization and has a functional group at the terminal.

4. The thin film of claim 1, wherein the polypropylene is terminally modified using a monomer selected from the group consisting of acrylic acid, methacrylic acid, acrylic acid ester, methacrylic acid ester, acrylamide, acrylonitrile, styrene and combinations thereof.

5. The thin film of claim 4, wherein the acrylic acid ester is selected from the group consisting of methyl acrylate, ethyl acrylate, butyl acrylate, isobutyl acrylate, 2-ethylhexyl acrylate, lauryl acrylate, stearyl acrylate, ethyldecyl acrylate, ethylhexyl deceyl acrylate, 2-ethoxyethyl acrylate, tetrahydrofurfuryl acrylate, trimethylolpropane triacrylate, 2-hydroxyethyl acylate, 2-hydroxypropyl acrylate, 1,4-butadiol diacrylate, 1,6-hexadiol diacrylate and combinations thereof.

6. The thin film of claim 4, wherein the methacrylic acid ester is selected from the group consisting of methyl methacrylate, ethyl methacrylate, butyl methacrylate, 2-ethylhexyl methacrylate, tridecyl methacrylate, stearyl methacrylate, cyclohexyl methacrylate, benzyl methacrylate, 2-hydroxylethyl methacrylate, 2-hydroxypropyl methacrylate, glycidyl methacrylate, ethylene glycol dimethacrylate and combinations thereof.

7. The thin film of claim 1, wherein the polypropylene is terminally modified using a monomer selected from the group consisting of vinyl acrylate, vinyl methacrylate, divinyl benzene, butyl vinyl acrylate and combinations thereof.

8. A method for producing a thin film of non-protonic electrolyte wherein a polyolefin film composed of a polyolefin composition containing a terminal-modified polypropylene is impregnated with a non-protonic electrolytic solution to immobilize the solution.

9. An electrolyte-immobilized liquid-film conductor, comprising a non-protonic electrolytic solution immobilized in a polyolefin film containing a terminal-modified polypropylene and electron-conductive substance.

10. The electrolyte-immobilized liquid-film conductor of claim 9 wherein said polyolefin film contains 10 to 100% by weight of a terminal-modified polypropylene and 1 to 200% by weight of an electron-conductive substance.

11. The electrolyte-immobilized liquid-film conductor of claim 9 wherein said terminal-modified polypropylene is produced by living polymerization and has a functional group at the terminal.

12. A method for producing an electrolyte-immobilized liquid-film conductor wherein a polyolefin film composed of a polyolefin composition containing a terminal-modified polypropylene and electron-conductive substance is impregnated with a non-protonic electrolytic solution to immobilize the solution.

13. A polymer battery, comprising the thin film of non-protonic electrolyte of claim 1, and an anode and cathode.

14. The polymer battery as set forth in claim 13, including an electrolyte-immobilized liquid-film conductor for at least one of its anode and cathode.

* * * * *

UNITED STATES PATENT AND TRADEMARK OFFICE
CERTIFICATE OF CORRECTION

PATENT NO.     : 6,218,053 B1
DATED          : April 17, 2001
INVENTOR(S)    : Koichi Kono et al.

It is certified that error appears in the above-identified patent and that said Letters Patent is hereby corrected as shown below:

<u>Title page,</u>
Item [73], please correct the Assignee to read: -- Tonen Chemical Corporation, Tokyo (JP) --

Signed and Sealed this

Seventh Day of January, 2003

JAMES E. ROGAN
*Director of the United States Patent and Trademark Office*